Jan. 4, 1966  J. C. EVERITT  3,226,830
MECHANISM FOR PRECISE ANGULAR POSITIONING
OF OPTICAL DEVICES
Filed May 1, 1964  2 Sheets-Sheet 1
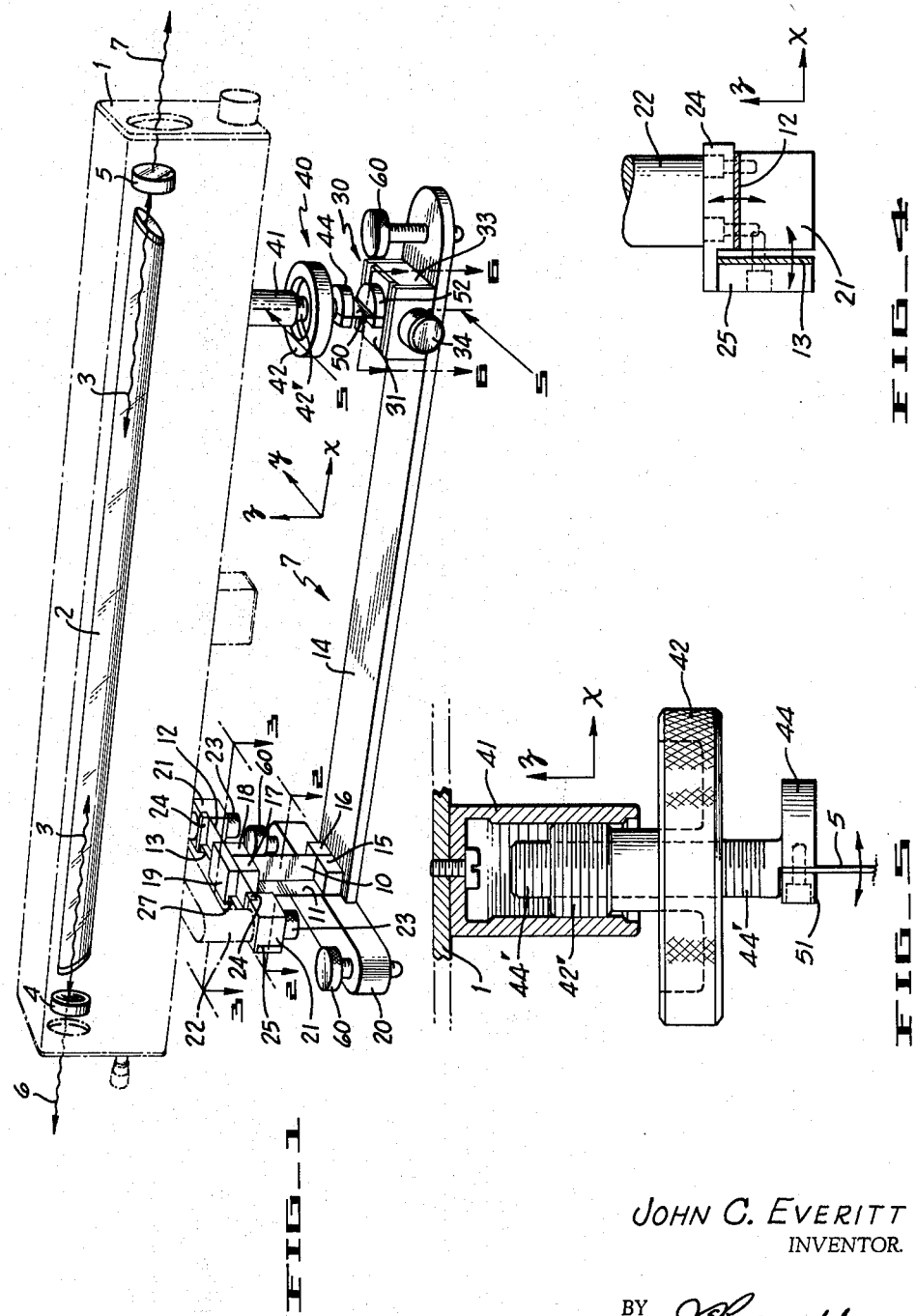
JOHN C. EVERITT
INVENTOR.
BY *J. Rosenblum*
ATTORNEY Jan. 4, 1966 J. C. EVERITT 3,226,830
MECHANISM FOR PRECISE ANGULAR POSITIONING
OF OPTICAL DEVICES
Filed May 1, 1964 2 Sheets-Sheet 2
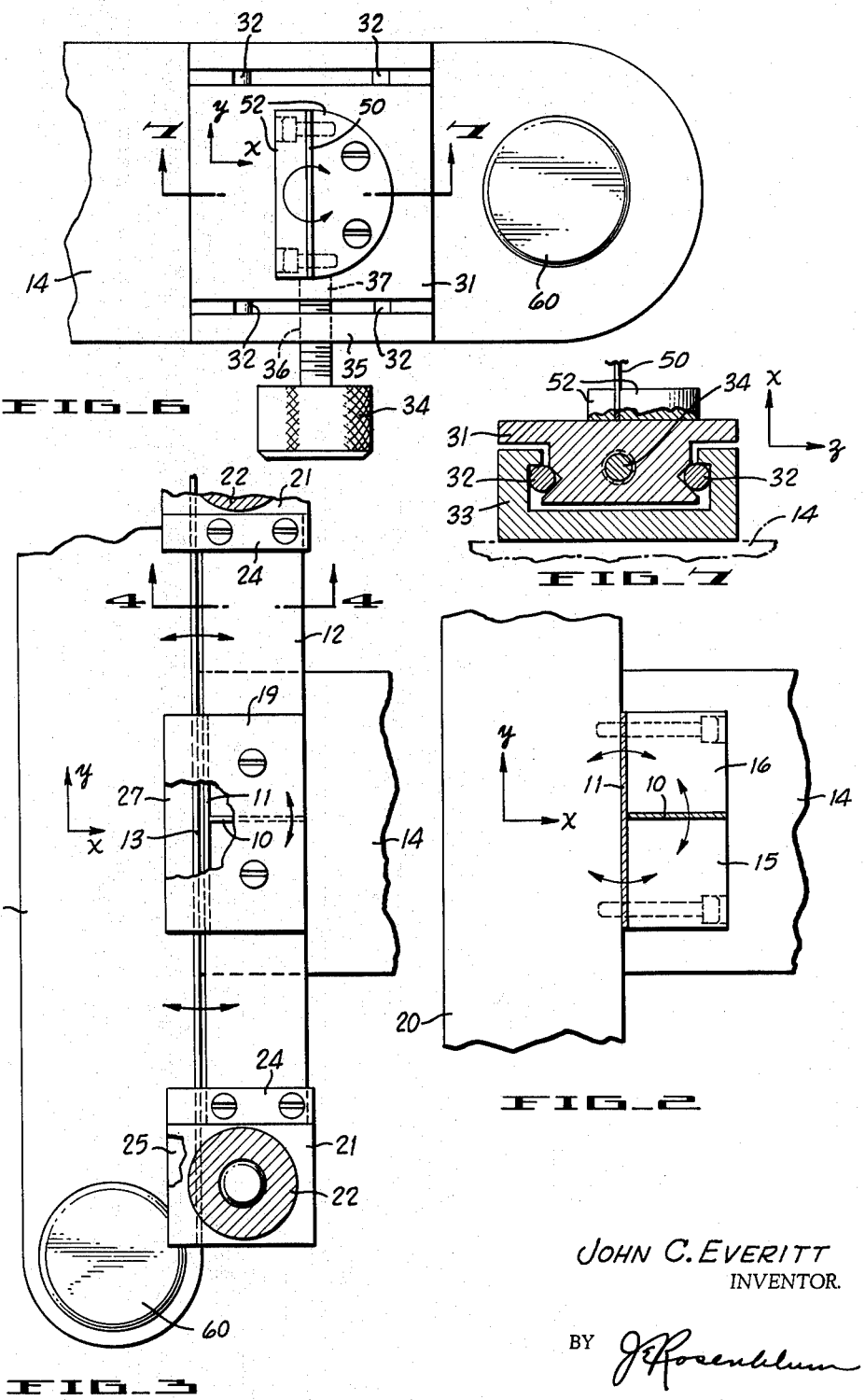
JOHN C. EVERITT
INVENTOR.
BY J. Rosenblum
ATTORNEY United States Patent Office 3,226,830
Patented Jan. 4, 1966

3,226,830
MECHANISM FOR PRECISE ANGULAR POSITIONING OF OPTICAL DEVICES
John C. Everitt, San Jose, Calif., assignor to Spectra-Physics Inc., Mountain View, Calif., a corporation of California
Filed May 1, 1964, Ser. No. 364,223
3 Claims. (Cl. 33—69)

The present invention relates to mechanical mechanisms which permit precise angular positioning of optical devices.

Many applications involving optical wave energy require the precise mechanical positioning of such optical devices as optical sources, lenses, mirrors, prisms, and optical detectors. This is important, for example, in the fields of interferometry, diffraction studies, optical data processing, optical communications, optical alignment, optical testing, and optical heterodyning, which rely on the coherent properties of the optical wave. It is the principal object of the present invention to provide a reliable and stable mechanism for making precise angular adjustment of such optical devices.

Accordingly, one feature of the present invention is the provision of an assembly of four intersecting leaf springs which permits precise independent angular rotation of an optical device about two perpendicular axes, thereby achieving a precise, stable and rapidly resettable angular positioning of said optical devices.

One particularly important application of the present invention is in the angular positioning of an optical device having an elongated structural configuration, for example, a laser or a telescope, in which it is desired to effect a precise angular positioning of the axis of said elongated optical device without introducing bending stresses which would, for example, adversely effect the alignment of the internal elements of said device.

Accordingly, a second feature of this present invention is the provision of a leaf spring mechanism for actuating rotation of an elongated optical device which is simultaneously effective to prevent the transmission of bending stresses to said optical device.

These and other features and advantages of the present invention will become apparent upon a consideration of the following detailed specification taken in connection with the accompanying drawing, wherein:

FIGURE 1 is a perspective view of a laser adjusting base in accordance with the present invention;

FIGURE 2 is a cross-sectional view taken along line 2—2 in FIGURE 1;

FIGURE 3 is a cross-sectional view taken along line 3—3 in FIGURE 1;

FIGURE 4 is a cross-sectional view taken along line 4—4 in FIGURE 3;

FIGURE 5 is a cross-sectional view taken along line 5—5 in FIGURE 1;

FIGURE 6 is a cross-sectional view taken along line 6—6 in FIGURE 1; and

FIGURE 7 is a cross-sectional view taken along line 7—7 in FIGURE 6.

Referring to FIGURE 1, there is shown a laser 1 which may be of any known type, for example, a Model 115 Gas Laser manufactured and sold by Spectra-Physics, Incorporated, of Mountain View, California. In such a laser, a tubular active medium 2 (for example, a confined gas at low pressure) is excited to optical emission (as by an electrical discharge), and radiation of a particular wavelength is stored in the form of a standing optical wave 3 by multiple axial reflections between an optical resonator formed by end reflectors 4 and 5. The small transmission through the reflectors at the operating wavelength constitutes the intense, temporally and spatially coherent, output beams 6 and 7 which are characteristic of laser operation.

In view of the coherent properties of the laser output wave, its focussing and collimation properties are limited only by the diffraction effects associated with the finite cross-section of the intra-cavity wave 3. In order to take full advantage of the coherent properties of the wave (for example to phase match the output wave front with that of a second wave), it is desirable to be able to adjust the angular orientation of the laser axis to within a fraction of the diffraction angle $\lambda/D$, where $\lambda$ is the operating wavelength and $D$ is the limiting cross-sectional dimension of the wave 3. This angular adjustment is provided by an adjusting base 7 in accordance with the present invention.

Referring to the x-y-z coordinate system shown in FIGURE 1, rotation of the laser axis about the z-axis is effected by perpendicular leaf springs 10 and 11 and rotation of the laser axis about the y-axis is effected by perpendicular leaf springs 12 and 13. Since these two rotations are independent, a rapid and readily re-settable angular adjustment of the laser axis can be made.

Each leaf spring is inherently capable of two modes of deformation—a twisting about the longitudinal axis and a bending about the transverse axis. According to the present invention perpendicularly intersecting pairs of springs are used to permit rotation about a single axis (defined by the intersection of the neutral plane of the springs) by constraining the springs against the bending mode of deformation. Thus spring 10 is inherently capable of twisting rotation about the z-axis and bending rotation about the x-axis, whereas spring 11 is inherently capable of twisting rotation about the z-axis and bending rotation about the y-axis. However, spring 10 is constrained against bending as a result of being clamped to tie-bar 14 by clamping blocks 15 and 16, and to spring 12 by clamping blocks 17, 18, and 19; and spring 11 is constrained against bending as a result of being clamped to cross-bar 20 by clamps 15 and 16, and to spring 13 by clamping blocks 17, 18, and 27. Therefore, springs 10 and 11 acting together permit rotation only about the z-axis.

Similarly, spring 12 is inherently capable of twisting rotation about the y-axis and bending rotation about the x-axis, whereas spring 13 is inherently capable of twisting rotation about the y-axis and bending rotation about the z-axis. However, spring 12 is constrained against bending as a result of being clamped to mounting blocks 21 (to which the front laser feet 22 are fastened by bolts 23) by clamping blocks 24, and to clamping block 19 by clamping blocks 17 and 18; and spring 13 is constrained against bending as a result of being clamped to mounting blocks 21 by clamping plates 25, and to spring 11 by clamping blocks 17, 18, and 19. Therefore, springs 12 and 13 acting together permit rotation only about the y-axis.

It can be noted that the two perpendicular axes of rotation (defined by the intersections of the neutral planes of the springs) intersect within the clamping block structure 17, 18, 19, so that linearity of adjustment is insured.

Rotation about the z-axis is actuated by dove-tail slide assembly 30. As is seen in FIGURES 6 and 7, this assembly comprises a block 31 which slides on precision ground rods 32 which are inserted in the slide base 33. Transverse motion is imparted to slide block 31 by differential screw 34 which screws through fixed mounting plate 35 to block 31. The pitch angle of the threads 36 in plate 35 is slightly larger than that of threads 37 in block 31 so that the net precision transverse motion (say inward upon clockwise rotation of screw 34) is the difference between the tendency of the screw 34 to travel inwardly into plate 35 and the tendency of block 31 to simultaneously travel outwardly on the screw 34.

Rotation about the y-axis is actuated by a second differential screw assembly as seen in detail in FIGURE 5. The foot 41 of the laser 1 is internally threaded to receive a threaded handwheel 42. The handwheel 42 is internally threaded to screw onto the fixed threaded stud 44. The pitch angle of the internal thread of handwheel 42 is slightly larger than that of the internal threads of laser foot 41 so that the net precision longitudinal motion (say downward upon clockwise rotation of handwheel 42) is the difference between the tendency of the screw 42 to travel down the threaded portion 44' of stud 44 and the tendency of the foot 41 to simultaneously travel up the threaded portion 42' of the handwheel 42.

The stud 44 and the slide 31 are interconnected by a leaf spring 50 (attached to stud 44 by clamping block 51 and to slide 31 by clamping blocks 52). Accordingly, any bending moment which would be introduced in the laser 1 as a consequence of the motion imparted by handwheel 42 is taken up by the bending of the leaf spring 50 which is disposed in a plane transverse to the laser axis. In addition, any bending moment which would be introduced in the laser 1 as a consequence of the motion imparted by slide screw 34 is taken up by the rotation of stud 44 inside the handwheel 42.

It should be noted that the particular resonator configuration shown in FIGURE 1 uses a spherical reflector 4 and a flat reflector 5 separated by a distance equal to the radius of curvature of the spherical reflector. Under these circumstances, the intra-cavity radiation is focussed to a small plane wave spot on the reflector 5 such that beam 7 appears to emanate from a point source. In the event that it is desired to direct this beam into an external optical system, it is important that the flat reflector be located at the right end of the laser 1 (as shown in FIGURE 1), since this is the only end which undergoes translation, and translation of the point source is required for angular deflection of the beam if passed through a fixed external optical system.

In one embodiment, the differential screw mechanisms described with reference FIGURES 5 and 6 utilized one set of threads (36 and 44') having 28 turns/inch and one set of threads (37 and 42) have 32 turns/inch, to give a translational resolution of better than two microns with $\frac{1}{25}$ turn of the differential screw mechanism. The length of the laser 1 is 60 cm. with a limiting cross-sectional dimension D for the intra-cavity wave 3 equal to 5 mm. For operation at $\lambda=6328$ A. in a helium-neon gas laser, this translational resolution yields a rotational resolution (of springs 10, 11, 12, and 13) of better than one arc-second, which is $\frac{1}{50}$ of the diffraction angle $\lambda/D$. The total range of both the longitudinal and translational adjustments is 6 mm. yielding a total range of 50 arc-minutes in angular adjustment. The springs 10, 11, 12, and 13 are made of $\frac{1}{16}$ inch stainless steel and, within this range, operate well within the proportional limit of their elastic curve for reliable, stable, and reproducible operation.

Coarse adjustments, prior to the above precision settings are made with the three-point leveling screws 60.

I claim:

1. A mechanism for precise angular adjustment of an optical device, comprising: a first pair of perpendicularly disposed leaf springs; means for constraining said first pair of leaf springs against bending so that said springs can rotate only by twisting about a first axis defined by the intersection of the planes in which said springs are disposed; a second pair of perpendicularly disposed leaf springs; means for constraining said second pair of leaf springs against bending so that said springs can rotate only by twisting about a second axis defined by the intersection of the planes in which said springs are disposed, said second axis being perpendicular to, and intersecting with, said first axis; means for securing an optical device to said two sets of springs; and means for effecting independent angular rotation of said springs, and hence said optical device, about each of said perpendicular axes.

2. A mechanism for effecting precise angular adjustment of an elongated optical device, comprising: means adapted to support said elongated optical device at one end thereof for providing angular rotation of said optical device about each of two perpendicular axes; and means adapted to support said elongated device at the other end thereof for activating said independent rotations by transverse translation of said optical device in the direction of each of said axes, said means comprising a differential screw mechanism and a slide mechanism adapted to move transverse to the motion of said differential screw mechanism, and a leaf spring interconnecting said screw mechanism and said slide mechanism whereby bending moments are prevented from being introduced in said elongated optical device as a consequence of said angular rotations.

3. A mechanism according to claim 2 wherein said means for providing angular rotation comprises: a first pair of perpendicularly disposed leaf springs; means for constraining said first pair of leaf springs against bending so that said springs can rotate only, by twisting, about a first axis defined by the intersection of the planes in which said springs are disposed; a second pair of perpendicularly disposed leaf springs; and means for constraining said second pair of leaf springs against bending so that said springs can rotate only, by twisting, about a second axis defined by the intersection of the planes in which said springs are disposed, said second axis being perpendicular to, and intersecting with, said first axis.

References Cited by the Examiner

UNITED STATES PATENTS

| | | | |
|---|---|---|---|
| 2,370,042 | 2/1945 | Jesionowski | 308—3 X |
| 2,424,011 | 7/1947 | De Gramont | 33—50 |
| 2,493,254 | 1/1950 | Leupold | 33—50 |
| 2,721,049 | 10/1955 | Waldsmith | 248—23 |
| 3,063,670 | 11/1962 | Young | 248—358 |

ISAAC LISANN, *Primary Examiner.*